(12) United States Patent
Biswas et al.

(10) Patent No.: US 9,811,824 B2
(45) Date of Patent: Nov. 7, 2017

(54) METHOD AND APPARATUS FOR VERSION INDEPENDENT POINT OF SALE ACTIVATION (POSA) PRODUCT DOWNLOAD

(71) Applicant: Adobe Systems Incorporated, San Jose, CA (US)

(72) Inventors: Sanjeev Kumar Biswas, Bangalore (IN); Mayank Goyal, Noida (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 66 days.

(21) Appl. No.: 13/949,877

(22) Filed: Jul. 24, 2013

(65) Prior Publication Data
US 2015/0032560 A1 Jan. 29, 2015

(51) Int. Cl.
*G06G 1/14* (2006.01)
*G06Q 20/00* (2012.01)
*G06Q 20/34* (2012.01)
*G06Q 20/20* (2012.01)
*G06Q 30/02* (2012.01)
*G06Q 30/00* (2012.01)
*G06Q 10/00* (2012.01)

(52) U.S. Cl.
CPC ......... *G06Q 20/342* (2013.01); *G06Q 20/203* (2013.01); *G06Q 30/0238* (2013.01)

(58) Field of Classification Search
CPC ..... H04M 17/00; G06Q 30/06; G06Q 20/382; G06Q 20/354; G07F 7/025; G07F 7/1008; G07F 17/32; G07F 17/42
See application file for complete search history.

(56) References Cited

U.S. PATENT DOCUMENTS

| 6,298,336 B1* | 10/2001 | Davis ................... G06Q 20/105 705/41 |
| 6,947,571 B1* | 9/2005 | Rhoads ................... G06Q 30/02 382/100 |
| 7,228,567 B2* | 6/2007 | Serkowski ......... G06Q 30/0283 380/231 |
| 7,747,851 B1* | 6/2010 | Robinson ................ G06F 21/10 713/156 |
| 8,694,434 B1* | 4/2014 | Kley ..................... G06F 21/125 705/59 |
| 2003/0004889 A1* | 1/2003 | Fiala .................... G06Q 20/342 705/64 |
| 2007/0073872 A1* | 3/2007 | Wille ................... G06Q 20/346 709/224 |
| 2007/0192872 A1* | 8/2007 | Rhoads ................... G06F 3/017 726/26 |

* cited by examiner

*Primary Examiner* — Ig T An
(74) *Attorney, Agent, or Firm* — Keller Jolley Preece

(57) ABSTRACT

A computer implemented method and apparatus for version independent Point of Sale Activation (POSA) product download. The method comprises accessing a database, wherein the database comprises a plurality of entries associated with a plurality of Point of Sale Activation (POSA) cards available for purchase at a retail store; retrieving, from the database, a plurality of entries associated with a previous version of a software product, wherein the previous version of the software product has not been redeemed; generating a serial number for each retrieved entry, wherein each serial number is associated with a current version of the software product; and updating, in the database, each retrieved entry with the generated serial number.

19 Claims, 2 Drawing Sheets

METHOD AND APPARATUS FOR VERSION INDEPENDENT POINT OF SALE ACTIVATION (POSA) PRODUCT DOWNLOAD

BACKGROUND OF THE INVENTION

Field of the Invention

Embodiments of the present invention generally relate to software provisioning and, more particularly, to a method and apparatus for version independent Point of Sale Activation (POSA) product download.

Description of the Related Art

Point of Sale Activation (POSA) cards are used by software providers to enable purchasers to buy a download of a software product from a retail store. The POSA card, whether included in a software product box or a keycard, includes a redemption code that is used by the purchaser to redeem the software product from the software provider. When a purchaser buys the POSA card for the software product, the retail store informs the software provider that the POSA card was sold. When the purchaser, following instructions from the POSA card, logs into the software provider's server and enters the redemption code from the POSA card, the software is downloaded to the purchaser's computer and the software product associated with the redemption code is marked as redeemed in the software provider's database.

Currently, the redemption code on the POSA card is associated with a specific version of the software product. When a new version of a software product is released and shipped to retail stores, all POSA cards for the previous version must be recalled from the retail stores. The POSA cards need to be recalled because when a POSA card is purchased, the buyer is entitled to the latest version of the product. The POSA cards in the retail stores that were shipped for the previous version of the software include redemption codes that provision and download the previous version. As such, new redemption codes must be created for the new version of the software product. The requirement to recall all of the POSA cards for the previous version is a significant expense for the software providers.

Therefore, there is a need for a method and apparatus for version independent Point of Sale Activation (POSA) product download.

SUMMARY OF THE INVENTION

A method and apparatus for version independent Point of Sale Activation (POSA) product download substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

Figure 1:
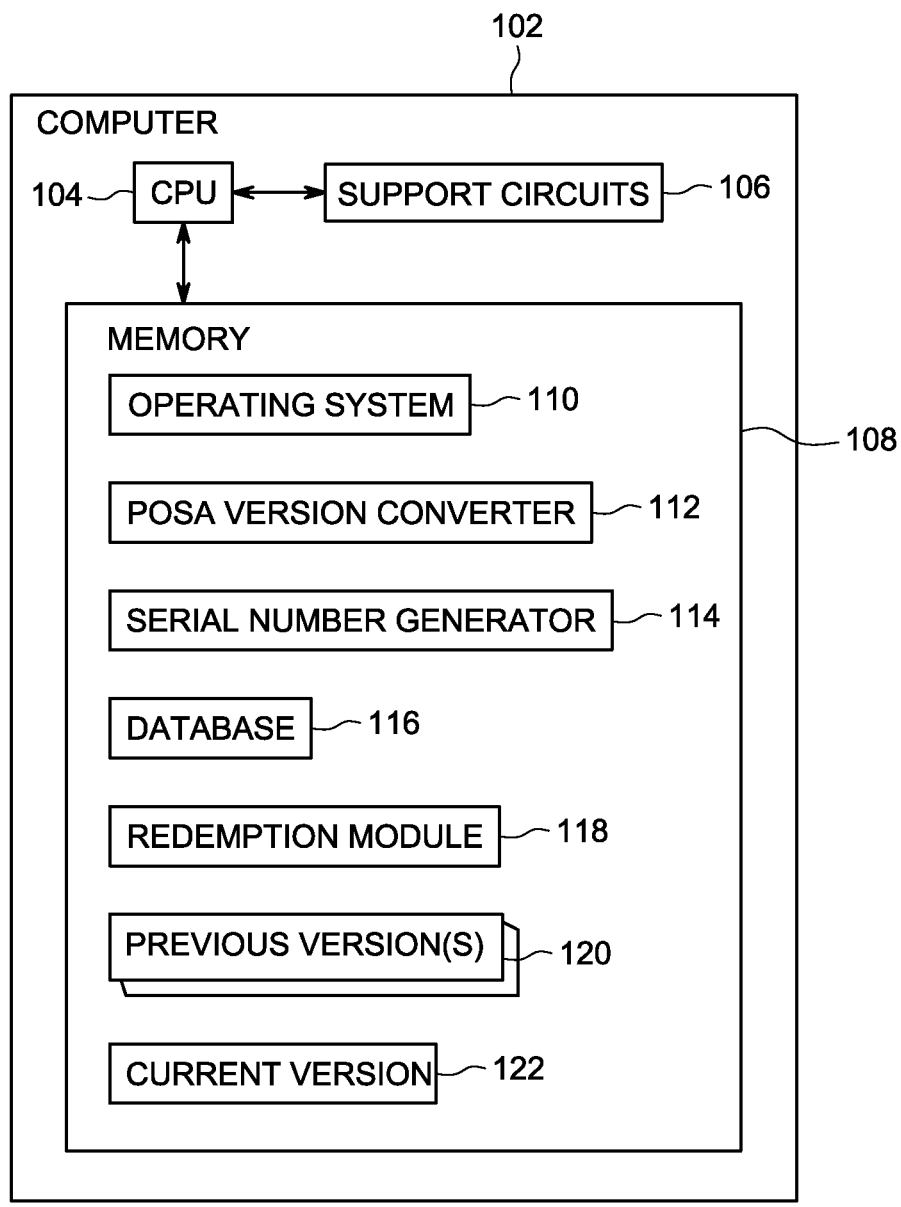
FIG. 1 is a block diagram of an apparatus for version independent Point of Sale Activation (POSA) product download, according to one or more embodiments.

While the method and apparatus is described herein by way of example for several embodiments and illustrative drawings, those skilled in the art will recognize that the method and apparatus for version independent Point of Sale Activation (POSA) product download is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for version independent Point of Sale Activation (POSA) product download defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention include a method and apparatus for version independent Point of Sale Activation (POSA) product download. When a new version of a software product is shipped to retail stores (in the form of boxes including POSA cards or keycards), the embodiments store serial numbers associated with the redemption code on each POSA card in a database. In addition to a serial number, each database entry includes a state field of NOT SOLD and another state field of NOT REDEEMED. The embodiments then query the database and retrieve entries that include a serial number for a previous version of the software product and have a state field of NOT REDEEMED. If the database entry is for a previous version with a state of NOT REDEEMED, it means that a POSA card for the software product is either still unsold at a retail store or sold by the retail store and not yet redeemed. The embodiments update the database entries such that, upon redemption, the current version of the software product is downloaded.

Each retrieved database entry includes a serial number that is associated with a previous version of the software product. The embodiments create new serial numbers for each retrieved entry, wherein each new serial number is associated with the current version of the software product, and update the entries in the database to include the new serial numbers. Thereafter, the redemption code from any POSA card that is used to redeem a software product, will redeem the most current version of the software product.

Advantageously, software providers, such as ADOBE Systems, Incorporated, may release new versions of software products, such as PHOTOSHOP, ACROBAT, and the like, without the costly task of recalling POSA cards from previous versions. All previously shipped POSA cards may still be used to redeem the most current version of a software product.

Various embodiments of a method and apparatus for version independent Point of Sale Activation (POSA) product download are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of an apparatus 100 for version independent Point of Sale Activation (POSA) product download, according to one or more embodiments. The apparatus 100 includes a computer 102. The computer 102 is a computing device, such as a desktop computer, laptop, tablet computer, and the like. The computer 102 is a server for a software provider, such as ADOBE Systems, Incorporated, that distributes POSA cards and provisions POSA product downloads. The computer 102 includes a Central Processing Unit (CPU) 104, support circuits 106, and a memory 108. The CPU 104 may include one or more commercially available microprocessors or microcontrollers that facilitate data processing and storage. The various support circuits 106 facilitate the operation of the CPU 104 and include one or more clock circuits, power supplies, cache, input/output circuits, and the like. The memory 108 includes at least one of Read Only Memory (ROM), Random Access Memory (RAM), disk drive storage, optical storage, removable storage and/or the like.

The memory 108 includes an operation system 110, a POSA version converter 112, a serial number generator 114, a database 116, a redemption module 118, one or more previous versions 120, and a current version 122. The operating system 110 may include various commercially known operating systems.

When a new (current) version 122 of a software product is shipped to retail stores (not shown), the POSA version converter 112 queries the database 116 and retrieves entries that include a serial number for a previous version 120 of the software product and also include a state field of NOT REDEEMED. The serial number generator 114 generates a new serial number for each entry retrieved from the database 116, wherein each new serial number is associated with the current version 122 of the software product. The POSA version converter 112 updates the entries in the database 116 with the new serial numbers for the current software product version 122. When a purchaser, using a redemption code from a POSA card, requests to download a software product to the purchaser's computer (not shown), the redemption module 118 receives the redemption code and supplies for purchaser download, the current version 122 of the software product, regardless of the version of the software product that was originally associated with the redemption code.

Figure 2:
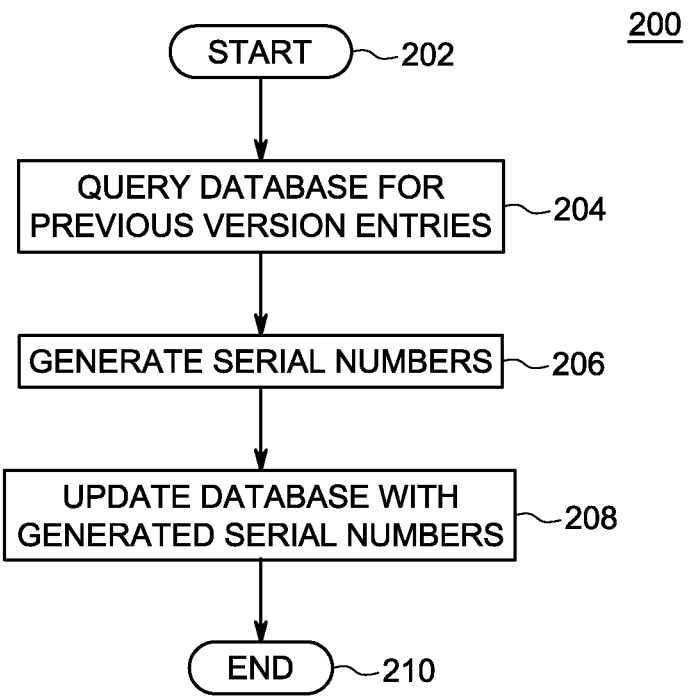
FIG. 2 is a flowchart of a method for enabling version independent POSA product downloads as performed by the POSA version converter of FIG. 1, according to one or more embodiments.

FIG. 2 is a flowchart of a method 200 for enabling version independent POSA product downloads as performed by the POSA version converter 112 of FIG. 1, according to one or more embodiments. The method 200 updates a database to enable any POSA card sold in a retail store to redeem a current version of a software product, regardless of the product version originally associated with a redemption code on the POSA card. The method 200 starts at step 202 and proceeds to step 204.

At step 204, the method 200 queries a database for entries associated with a previous version of a software product. The database includes an entry for each shipped software product, whether the software product is a boxed product that includes a POSA card or a POSA card keycard. Each entry of the database includes at least a stock keeping unit (SKU) for the software product and version, a serial number, a redemption code, and state information such as SOLD/NOT SOLD and REDEEMED/NOT REDEEMED. The method 200 queries the database for the SKU of a previous version of the software product having a state of NOT REDEEMED. The retrieved entries represent the POSA cards that include the previous version's redemption codes, which, although they may or may not have been sold, they have not yet been redeemed (or downloaded) by a purchaser.

The method 200 proceeds to step 206, where the method 200 generates a new serial number for each entry retrieved from the database and associates the new serial number with the current version of the software product. The method 200 proceeds to step 208, where the method 200 updates the database entries with the SKU for the current version of the software product, and the new serial number.

Thereafter, when a purchaser enters a redemption code from a POSA card, regardless of whether the redemption code was originally associated with a previous version of software product, the retrieved database entry will enable the current version of the software product for download by the purchaser.

The method 200 proceeds to step 210 and ends.

Figure 3:
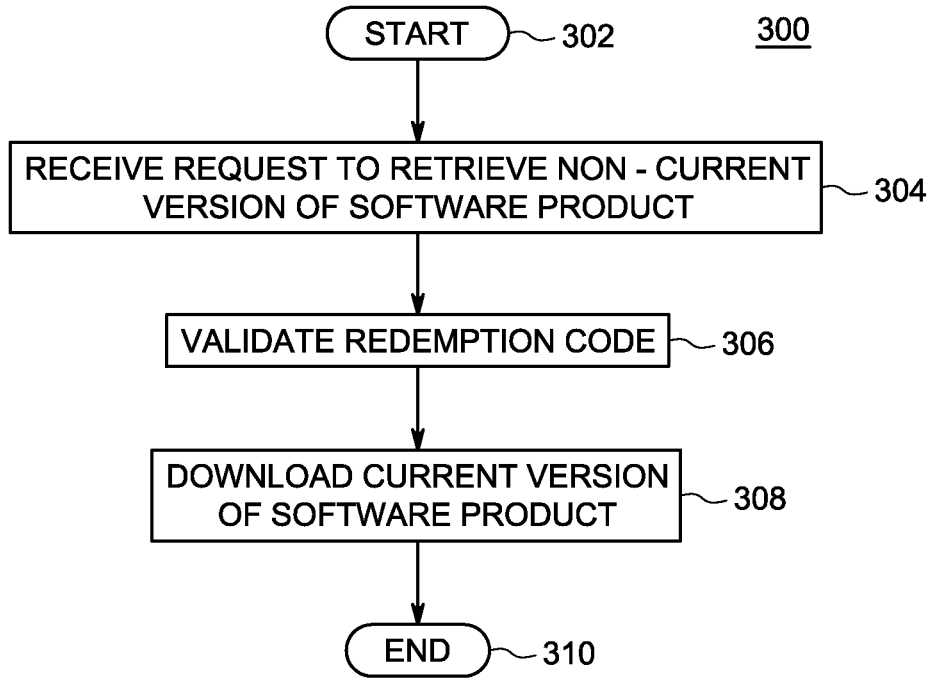
FIG. 3 is a flowchart of a method for providing a current version of a software download, as performed by the redemption module of FIG. 1, according to one or more embodiments.

FIG. 3 is a flowchart of a method 300 for providing a current version of a software download, as performed by the redemption module 118 of FIG. 1, according to one or more embodiments. The method 300 receives a request to redeem a previous version of a software product and instead, downloads the current version. The method 300 starts at step 302 and proceeds to step 304.

At step 304, the method 300 receives a request to redeem a software product. When a purchaser makes a purchase from a retail store, the purchaser receives a POSA card that includes a redemption code rather than the actual software product on disk. The purchaser logs into the server of the software provider and enters the redemption code to download the software product. In the time between when the purchase was made (and the POSA card acquired), and the time the purchaser redeems the software product, a new version of the software product may have been released. For example, the purchaser may have purchased version 3.0 of a software product, but version 4.0 has been released in the days or weeks after the purchase but before the purchaser attempts redemption.

The method 300 proceeds to step 306, where the method 300 validates the redemption code for the current version of the software product. Method 200 above updated the POSA database such that all redemption codes are associated with serial numbers for the current version of the software. The method 300 validates the redemption code by retrieving the entry in the POSA database associated with the redemption code and ensuring that the state information for the entry is set to SOLD and NOT REDEEMED. Other validations may also be performed. Upon successful validation, state information in the retrieved entry is set to REDEEMED.

The method 300 proceeds to step 308, where the method 300 downloads the current version of the software product. Thus, a purchaser is provided with a seamless experience to acquire a new version of a software product regardless of the fact that the software provider released the new version of the software product after the retail store sold the POSA to the purchaser. The purchaser need not be aware of when software releases are performed. A purchase of a software product from a retail store results in the download of the current version of the software product, regardless of the version that was purchased by the purchaser.

The method 300 proceeds to step 310 and ends.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java™, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
accessing, at a server having at least one processor operatively associated with a memory, a database by execution of instructions by the at least one processor, wherein the database comprises a plurality of entries associated with packages currently available for purchase at a point of sale for activation of at least a previous version of a software product;

retrieving from the plurality of entries associated with packages currently available for purchase at a point of sale from the database, by execution of instructions by the at least one processor, a plurality of entries each comprising a serial numbers associated with the previous version of the software product, wherein the previous version of the software product has not been redeemed;

generating, by execution of instructions by the processor, a new serial number for each retrieved entry, wherein each new serial number is associated with a current version of the software product;

updating, in the database, each retrieved entry by replacing a serial number associated with the previous version of the software product with a new serial number associated with the current version of the software product;

receiving a request to download the software product corresponding to a package for a previous version of the software product that has not been redeemed;

accessing the database to retrieve an updated entry based on the received request, the updated entry comprising a new serial number associated with the current version of the software product; and providing for download, based on the updated entry, the current version of the software product instead of the previous version of the software product.

2. The method of claim 1, wherein the package for the previous version of the software product comprises a software product box or a keycard.

3. The method of claim 1, wherein each of the plurality of entries in the database comprises a serial number associated with a software product version, a stock keeping unit (SKU) associated with a software product version, and a redemption indicator.

4. The method of claim 1, wherein the request comprises a redemption code.

5. The method of claim 4, wherein the redemption code is associated with the previous version of the software product.

6. The method of claim 1, wherein updating each retrieved entry causes entries associated with a plurality of previous versions of the software product to be associated with the current version of the software product.

7. An apparatus for version independent Point of Sale Activation (POSA) product download comprising:
at least one processor; and
at least one non-transitory computer-readable storage medium storing instructions thereon that, when executed by the at least one processor, cause the apparatus to:
access a database comprising a plurality of entries associated with a plurality of unactivated Point of Sale Activation (POSA) cards for a software product available for purchase at a retail store;
retrieve, from the database, a plurality of entries each comprising a serial numbers associated with a previous version of the software product, wherein the previous version of the software product has not been redeemed;
generate a new serial number for each retrieved entry, wherein each new serial number is associated with a current version of the software product;
update, in the database, each retrieved entry by replacing a serial number associated with the previous version of the software product with a new serial number associated with the current version of the software product;

receive a request to download the software product corresponding to a package for a previous version of the software product that has not been redeemed;

access the database to retrieve an updated entry corresponding to the received request, the updated entry comprising a new serial number associated with the current version of the software product; and provide for download, based on the updated entry, the current version of the software product instead of the previous version of the software product.

8. The apparatus of claim 7, wherein the database is a Point of Sale Activation (POSA) database, and wherein each of the plurality of entries in the POSA database comprises a serial number associated with a software product version, a stock keeping unit (SKU) associated with a software product version, and a redemption indicator.

9. The apparatus of claim 7, wherein the request comprises a redemption code.

10. The apparatus of claim 9, wherein the redemption code is associated with the previous version of the software product.

11. The apparatus of claim 7, further comprising instructions that, when executed by the at least one processor, cause the apparatus to update database entries associated with a plurality of previous versions of the software product to be associated with the current version of the software product.

12. A non-transitory computer readable medium for storing computer instructions that, when executed by at least one processor causes the at least one processor to perform version independent Point of Sale Activation (POSA) product download by performing steps comprising:
updating a plurality of entries in a database, wherein the database comprises a plurality of entries associated with a plurality of POSA cards currently available for purchase at a retail store, wherein each entry is updated by:
retrieving, from the database, a plurality of entries each comprising a serial numbers associated with a previous version of a software product, wherein the previous version of the software product has not been redeemed,
generating a new serial number for each retrieved entry, wherein each new serial number is associated with a current version of the software product, and
updating, in the database, each retrieved entry by replacing a serial number associated with the previous version of the software product with a new serial number associated with the current version of the software product;

receiving a request to download the software product corresponding to a package for a previous version of the software product that has not been redeemed;

accessing the database to retrieve an updated entry corresponding to the received request, the updated entry comprising a new serial number associated with the current version of the software product; and providing, for download and based on the updated entry, the current version of the software product instead of the previous version of the software product.

13. The computer readable medium of claim 12, wherein the plurality of POSA cards are sold by the retail store in a software product box or as a keycard.

14. The computer readable medium of claim 12, wherein each of the plurality of entries in the database comprises a serial number associated with a software product version, a stock keeping unit (SKU) associated with a software product version, and a redemption indicator.

15. The computer readable medium of claim 12, wherein the request comprises a redemption code.

16. The computer readable medium of claim 15, wherein the redemption code is associated with the previous version of the software product.

17. The computer readable medium of claim 12, wherein updating causes the database entries associated with a plurality of previous versions of the software product to be associated with the current version of the software product.

18. The method of claim 4, further comprising validating, in response to the request to download the previous version of the software product, the redemption code for downloading the current version of the software product by verifying that state information for the updated entry indicates that the corresponding package is sold and unredeemed.

19. The apparatus of claim 9, further comprising instructions that, when executed by the at least one processor, cause the apparatus to validate, in response to the request to download the previous version of the software product, the redemption code for downloading the current version of the software product by verifying that state information for the updated entry indicates that the corresponding software package is sold and unredeemed.

* * * * *